US011872825B2

(12) United States Patent
Tanaka

(10) Patent No.: US 11,872,825 B2
(45) Date of Patent: Jan. 16, 2024

(54) HEAD COOLING DEVICE, INKJET RECORDING DEVICE AND COOLING CONTROL METHOD

(71) Applicant: KYOCERA Document Solutions Inc., Osaka (JP)

(72) Inventor: Kakeru Tanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 4 days.

(21) Appl. No.: 17/844,182

(22) Filed: Jun. 20, 2022

(65) Prior Publication Data

US 2022/0402287 A1 Dec. 22, 2022

(30) Foreign Application Priority Data

Jun. 21, 2021 (JP) ................................ 2021-102274

(51) Int. Cl.
*B41J 29/377* (2006.01)
*B41J 2/18* (2006.01)

(52) U.S. Cl.
CPC ................ *B41J 29/377* (2013.01); *B41J 2/18* (2013.01); *B41J 2202/08* (2013.01); *B41J 2202/20* (2013.01)

(58) Field of Classification Search
CPC .. B41J 29/377; B41J 2202/08; B41J 2202/20; B41J 2/18
See application file for complete search history.

(56) References Cited

U.S. PATENT DOCUMENTS

2009/0256870 A1* 10/2009 Nakamura ............ B41J 29/377 347/17

FOREIGN PATENT DOCUMENTS

JP 2007324498 A 12/2007
JP 2020160218 A * 10/2020

* cited by examiner

*Primary Examiner* — Henok D Legesse
(74) *Attorney, Agent, or Firm* — Alleman Hall Creasman & Tuttle LLP

(57) ABSTRACT

A head cooling device includes a refrigerant supplying portion, a switching portion, and a switch processing portion. The refrigerant supplying portion supplies a refrigerant to each of a plurality of recording heads, which ejects ink, through a supplying path. The switching portion can switch a corresponding supplying path of at least one of the plurality of recording heads. The switch processing portion controls the switching portion to switch the corresponding supplying path so as to decrease the temperature difference among the plurality of recording heads.

7 Claims, 9 Drawing Sheets

HEAD COOLING DEVICE, INKJET RECORDING DEVICE AND COOLING CONTROL METHOD

INCORPORATION BY REFERENCE

This application is based upon and claims the benefit of priority from the corresponding Japanese Patent Application No. 2021-102274 filed on Jun. 21, 2021, the entire contents of which are incorporated herein by reference.

The present invention relates to a head cooling device, an inkjet recording device and a cooling control method.

BACKGROUND

As a related art of the present invention, the technique of using a refrigerant to cool a plurality of parts where temperature rise (hereinafter referred to as "temperature-risen parts") in an image forming device is known. In the inkjet recording device including a plurality of recording heads, the recording heads can be the temperature-risen parts.

In the image forming apparatus of the related art, the temperature-risen parts to be cooled are provided with respective heat receiving members that are connected to one another with piping. The heat receiving members cool the respective temperature-risen parts while a refrigerant is circulated in the piping. The refrigerant is circulated in the temperature-risen parts in the order from the temperature-risen part having a low-temperature target which is a temperature specification value specified in advance. With this, each of the temperature-risen parts is efficiently cooled with an appropriate cooling order.

SUMMARY

A head cooling device according to one aspect of the present invention includes a refrigerant supplying portion, a switching portion, and a switch processing portion. The refrigerant supplying portion supplies a refrigerant to each of a plurality of recording heads through a corresponding supplying path, the recording heads ejecting ink. The switching portion is able to switch a supplying path of corresponding one of the plurality of recording heads. The switch processing portion controls the switching portion to switch the supplying path so as to reduce the difference in temperature (hereinafter referred to as "temperature difference") among the plurality of recording heads.

An inkjet recording device according to another aspect of the present invention includes a body having the head cooling device and the plurality of recording heads.

A cooling control method according to another aspect of the present invention is applied to a head cooling device including a refrigerant supplying portion and a switching portion. The refrigerant supplying portion supplies a refrigerant to each of a plurality of recording heads through a corresponding supplying path. The recording heads are configured to eject ink. The switching portion is able to switch the supplying path of at least one of the plurality of recording heads. The cooling control method controls the switching portion to switch the supplying path so as to reduce temperature difference among the plurality of recording heads.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present invention will be described below with reference to the drawings. The embodiments below are merely examples of the present invention and are not intended to limit the technical scope of the present invention.

First Embodiment

[1] Entire Structure of Inkjet Recording Device

First, the entire structure of an inkjet recording device 10 according to the first embodiment will be described with reference to FIGS. 1 to 3.

As an example, the inkjet recording device 10 of the present embodiment is a printer (image forming apparatus) including recording heads 51 ejecting ink on the surface of a sheet Sh1 to form an image on the sheet Sh1 using print processing of an inkjet method. The print processing is a process to form an image on an image-forming target. The sheet Sh1 is an example of the image-forming target with an image formed thereon by the inkjet recording device 10 and is a sheet-like medium such as paper or resin film.

The inkjet recording device 10 may have a function to form an image by the inkjet method, and may be, for example, a multifunction device having a scan function reading image data from a document, a facsimile function and a copy function, besides the print function. In addition, the inkjet recording device 10 may be a facsimile device or a copy machine.

Figure 1:
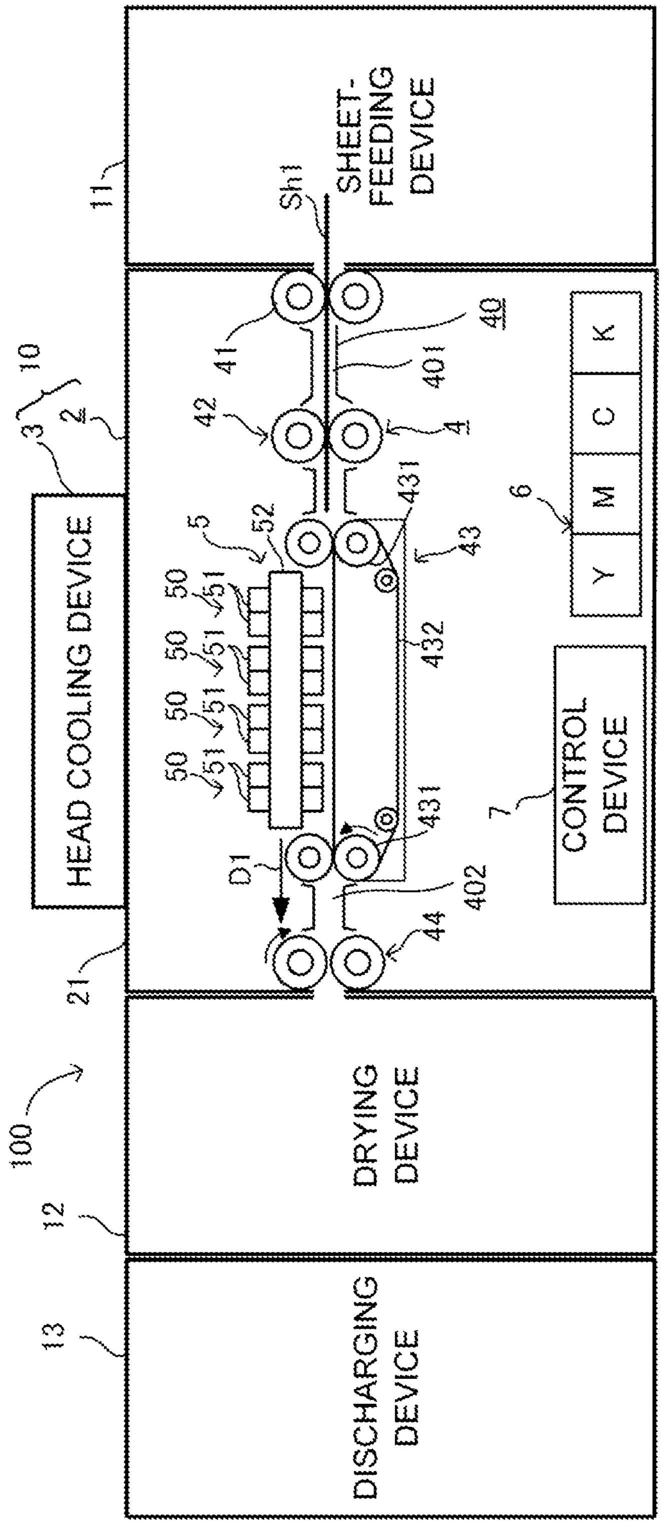
FIG. 1 is a schematic diagram showing the structure of an image forming system according to a first embodiment.

As shown in FIG. 1, the inkjet recording device 10 configures an image forming system 100 together with a sheet-feeding device 11, drying device 12 and discharging device 13. In other words, the image forming system 100 according to the present embodiment includes the inkjet recording device 10, sheet-feeding device 11, drying device 12 and discharging device 13. The members above are connected together in the order of the sheet-feeding device 11, inkjet recording device 10, drying device 12 and the discharging device 13 in the conveyance direction of a sheet Sh1. Accordingly, the image forming system 100 is able to apply to the sheet Sh1 a series of continuous processing by the sheet-feeding device 11, inkjet recording device 10, drying device 12 and discharging device. These devices of the image forming system 100 are collectively controlled by a control device 7 of the inkjet recording device 10. Alternatively, another control device to collectively control each device may be provided besides the control device 7.

The sheet-feeding device 11 is able to store a plurality of sheets. The sheet-feeding device feeds the sheet Sh1 to the inkjet recording device 10 one by one. The inkjet recording device 10 ejects ink from a recording head 51 onto the sheet Sh1 fed from the sheet-feeding device 11 to form an image (ink image) thereon by the inkjet method. The inkjet recording device 10 sends the sheet Sh1 with the image formed thereon to the drying device 12 of the subsequent stage.

The drying device 12 includes inside thereof a drying chamber accommodating a heater or heat-pump type heating unit. The drying device 12 heats the surface of the sheet Sh1 conveyed from the inkjet recording device 10 to the drying chamber to dry the image formed on the sheet Sh1. The drying device 12 has an exhaust fan exhausting (discharging) moisture from the drying chamber. The drying device 12 sends the sheet Sh1 applied with the dry processing to the discharging device 13 of the subsequent stage. Then, the discharging device 13 discharges the sheet Sh1 with the image formed thereon by the inkjet method to the inkjet recording device 10.

The discharging device 13 stocks the sheet Sh1 conveyed from the drying device 12. The discharging device 13 may have a post-processing function such as a staple function or punch function, for example. In this case, the discharging device 13 is able to apply any selective post-processing to the sheet Sh1 with the image formed thereon. In the single-sided printing in which an image is formed only on one side of the sheet Sh1, the sheet Sh1 applied with the drying processing in the drying device 12 is sent to the discharging device 13. Alternatively, in the double-sided printing in which images are formed on both sides of the sheet Sh1, the sheet Sh1 is returned to the inkjet recording device 10 after drying processing in the drying device 12. Then, in the inkjet recording device 10, an image is formed on the rear surface of the sheet Sh1 that is then sent to the discharging device 13 after receiving drying processing.

Figure 2:
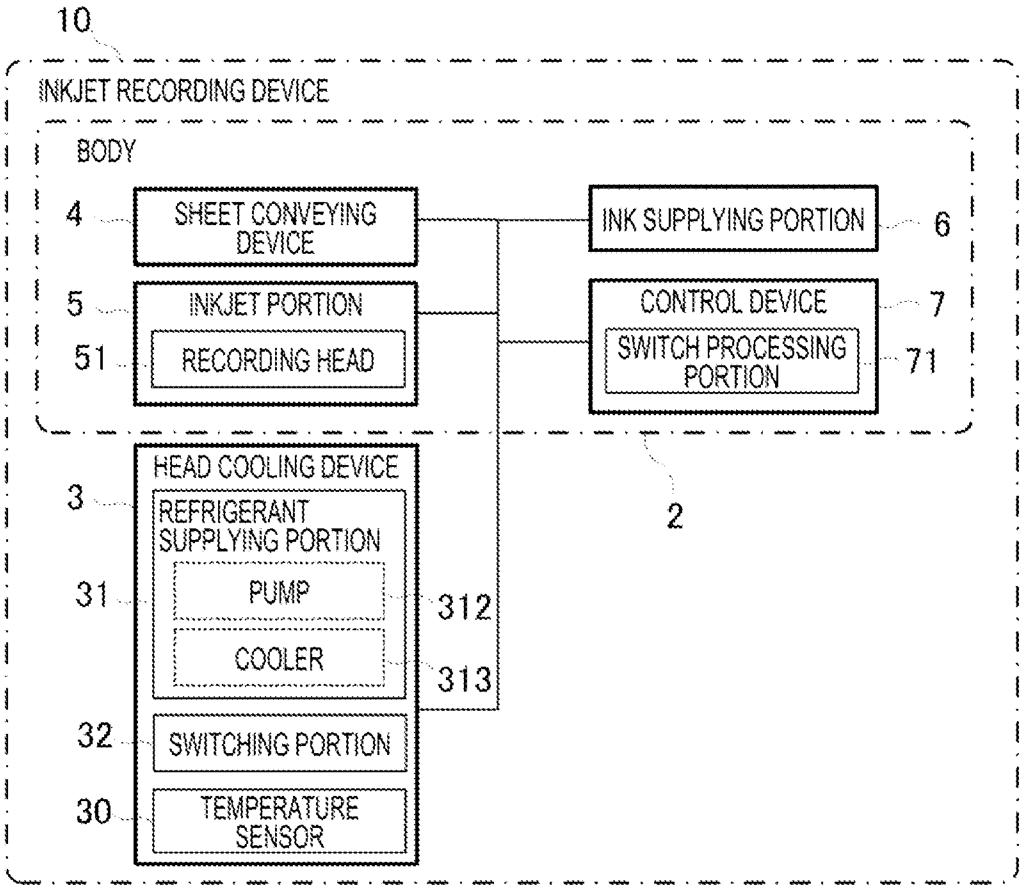
FIG. 2 is a block diagram showing the formation of an inkjet recording device according to the first embodiment.
Figure 3:
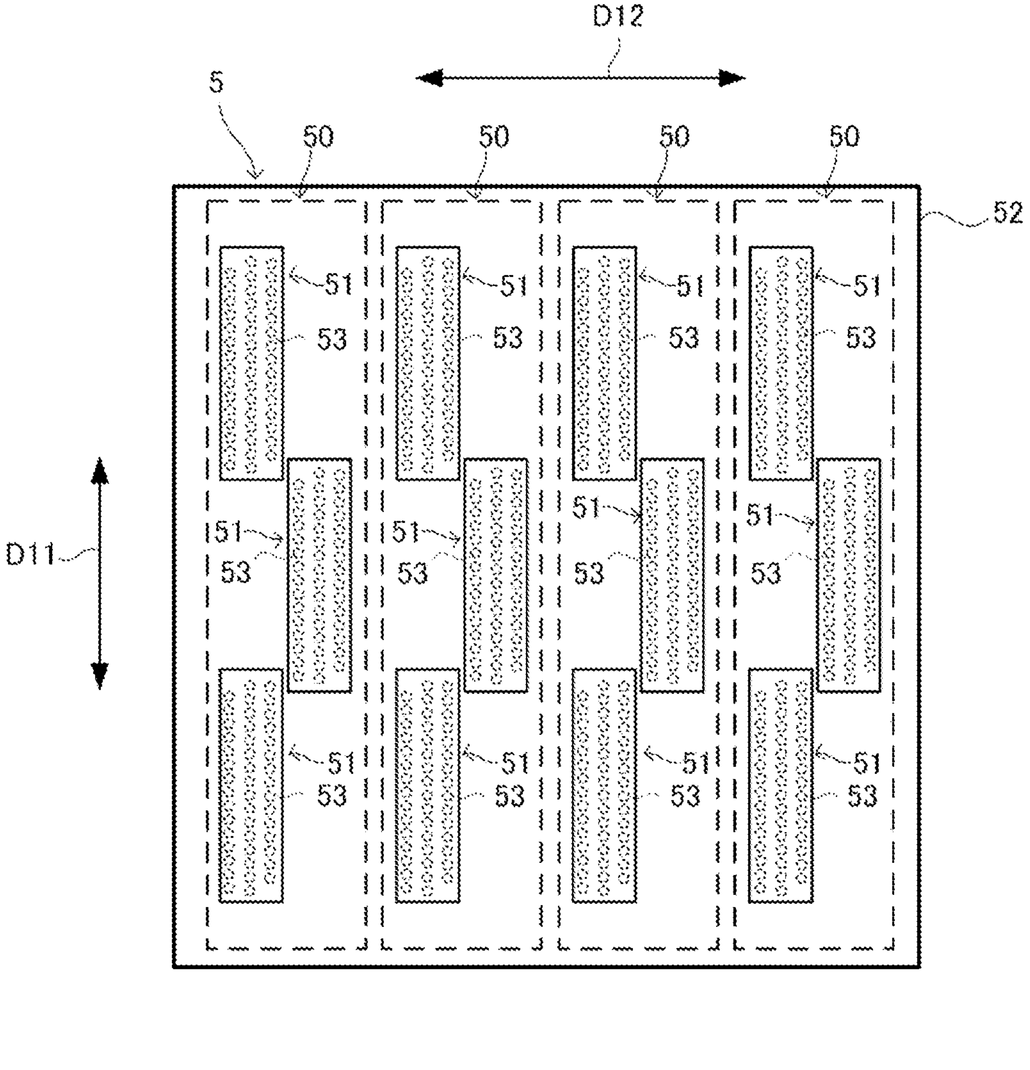
FIG. 3 is a schematic diagram showing the structure of an inkjet portion of the inkjet recording device according to the first embodiment.

As shown in FIG. 1 and FIG. 2, the inkjet recording device 10 includes a body 2 and a head cooling device 3. The body 2 of the inkjet recording device 10 includes a sheet conveying device 4, an inkjet portion 5, an ink supplying portion 6 and a control device 7. The inkjet portion 5 has a plurality of recording heads 51. The sheet conveying device 4, inkjet portion 5, ink supplying portion 6 and control device 7 are stored in a housing 21 forming an outer shell of the body 2.

The sheet conveying device 4 conveys a sheet Sh1 fed from the sheet-feeding device through a conveying path 40 one by one. Then, the sheet Sh1 sent into the housing 21 from the sheet-feeding device 11 is conveyed through the conveying path 40 below the inkjet portion 5 in a conveyance direction D1 to the drying device 12. The conveying path 40 functions to convey the sheet Sh1 inside the housing 21 and includes a front-stage conveying path 401 upstream of the inkjet portion 5 and a rear-stage conveying path 402 downstream of the inkjet portion 5. The sheet conveying device 4 conveys the sheet Sh1 fed from the sheet-feeding device 11 to the inkjet portion 5 through the front-stage conveying path 401 and sends it out to the drying device 12 through the rear-stage conveying path 402.

The sheet conveying device 4 includes a sheet delivery portion 41, one or more sets of front-stage conveying roller pairs 42, main conveying unit 43 and a discharging roller pair 44, etc. The sheet delivery portion 41 feeds a sheet Sh1 fed from the sheet-feeding device 11 to the front-stage conveying path 401 one by one. The one or more sets of front-stage conveying roller pairs 42 receive the sheet Sh1 conveyed from the sheet delivery portion 41 and conveys it toward the main conveying unit 43.

The main conveying unit 43 is disposed below the inkjet portion 5. The front-stage conveying path 401 extends from the sheet-feeding device 11 to a lower part of the inkjet portion 5 (above the main conveying unit 43). The main conveying unit 43 conveys a sheet Sh1 with the first surface thereof (front surface) facing the inkjet portion 5. On the first surface of the sheet Sh1, an image is formed. The main conveying unit 43 includes a plurality of tension rollers 431 and a main conveying belt 432 that is supported and rotated by the plurality of tension rollers 431. With this, the main conveying unit 43 conveys the sheet Sh1 laid on the main conveying belt 432 toward the discharging roller pair 44.

The discharging roller pair 44 discharges the sheet Sh1 with an ink image formed thereon to the drying device 12. The rear-stage conveying path 402 extends from below the inkjet portion 5 (above the main conveying unit 43) to the drying device 12.

The inkjet portion 5 is disposed above the main conveying unit 43. The inkjet portion 5 ejects a plurality of color inks onto the sheet Sh1 conveyed by the main conveying unit 43 of the sheet conveying device 4 to form an ink image on the first surface of the sheet Sh1.

The inkjet portion 5 includes a plurality of recording heads 51 and a head frame 52 supporting the recording heads 51. The plurality of recording heads 51 eject a plurality of color inks onto the sheet Sh1 conveyed by the main conveying unit 43 to form an image on the sheet Sh1.

In the example in FIG. 1, the plurality of recording heads 51 are separated into four line-heads 50 corresponding to black, cyan, magenta and yellow inks. The ink supplying portion 6 supplies color inks (K, C, M, Y) to the respective recording heads 51 of the line-heads 50. The four line-heads 50 are arranged and fixed in a sub-scanning direction D12 with predetermined positional relations (see FIG. 3). The number of the line-heads 50 that the inkjet portion 5 has is not limited to four, and may be two, three, five or more.

The plurality of recording heads 51 are disposed so as to form a gap of about 1 mm between the ink ejecting faces of the heads 51 and the upper surface of the sheet Sh1 laid on the main conveying belt 432. As shown in FIG. 3, the plurality of recording heads 51 are disposed so that the lengthwise directions thereof align with the main scanning direction D11. As an example, in the present embodiment, each line-head 50 in each color includes three recording heads 51. The ink ejecting face of each recording head 51 is provided with a plurality of ink nozzles 53 that eject ink on the sheet Sh1 being conveyed along the conveying path 40. Each recording head 51 includes a plurality of piezoelectric elements corresponding to the plurality of ink nozzles 53. Each of the piezoelectric elements vibrates in response to a driving signal supplied from the control device 7, thereby pressurizing and ejecting (spurting) the ink from the corresponding ink nozzle 53.

The control device 7 collectively controls the inkjet recording device 10. The control device 7 is composed mainly of a computer system including one or more processors and one or more non-volatile memories. In the inkjet recording device 10, one or more processors execute a program so that the control device 7 is able to function. The program may be stored in the memory (storing portion) in advance, may be provided through a telecommunication line such as the Internet, or may be provided through recording in a non-temporary recording medium readable by a computer system such as a memory card or optical disc. One or more processors each are composed of one or more electronic circuits including semiconductor integrated circuit. In addition, the computer system here includes a microcontroller having one or more processors and one or more memories.

The control device 7 controls the sheet conveying device 4, inkjet portion 5 and ink supplying portion 6, etc. The control device 7 in the present embodiment functions as a cooling control device to control the head cooling device 3. In other words, the control device 7 implements a cooling control method through execution of the control program recorded in the memory. The control device 7 for controlling the head cooking device 3 may be separated from a main control device collectively controlling the inkjet recording device 10.

The inkjet recording device 10 further includes a maintenance unit, a cap unit and an operation display portion. The maintenance unit performs a wiping operation to wipe off and clean up the ink ejecting face (bottom surface of the recording head 51). The cap unit covers the ink ejecting face of the recording head 51 for protection from drying. The operation display portion is a user interface in the inkjet recording device. The operation display portion includes a display portion such as a liquid crystal display displaying various information in response to control instruction from the control device 7 and an operation portion such as a switch or touch panel inputting various information to the control device in response to user operation.

Meanwhile, as a related art of the present invention, the technique to cool a plurality of temperature-risen parts of the image forming apparatus using a refrigerant is known. In the inkjet recording device including a plurality of recording heads, the plurality of recording heads each can be the temperature-risen parts.

In the image forming apparatus of the related art, the temperature-risen parts requiring cooling are provided with respective heat receiving members. The heat receiving members are connected together with piping. A refrigerant is circulated in the piping to cool the temperature-risen parts via the heat receiving members. Furthermore, in the related art, the refrigerant is circulated in the order from a temperature-risen part of low temperature-target, which is a temperature specification value, to efficiently cool each of the temperature-risen parts with an appropriate cooling order.

Unfortunately, in the configuration of the related art, the temperature difference among the recording heads can be found due to, for example, driving conditions of the recording heads (temperature-risen parts) or drying device which is a heat source. This can result in variation in the ink ejecting performance among the recording heads and adversely affect the quality (image quality) of the image to be formed.

In contrast, the inkjet recording device 10 according to the present embodiment is able to include a head cooling device 3 that prevents variation in the ink ejecting performance among the recording heads 51 thanks to the configuration described below.

Specifically, as shown in FIG. 2, the head cooling device 3 of the inkjet recording device 10 of the present embodiment includes a refrigerant supplying portion 31, a switching portion 32 and a switch processing portion 71. The refrigerant supplying portion 31 supplies a refrigerant to each of the plurality of recording heads 51 through respective supplying paths 33 (see FIG. 4). The recording heads 51 are designed to eject ink. The switching portion 32 is able to switch a supplying path 33 of at least one of the plurality of recording heads 51. The switch processing portion 71 controls the switching portion 32 for switching the supplying path 33 so as to reduce temperature difference among the plurality of recording heads 51. As an example, the switch processing portion 71 in the present embodiment is provided to the control device 7 as a function of the control device 7.

The "refrigerant" in this disclosure is a fluid (heating medium) and includes, for example, water, liquid other than water and gas such as cooling gas. In addition, the switching portion 32 "is able to switch a supplying path 33" indicates that it is able to switch between selection of one of multiple paths or another one of the multiple paths as the supplying path 33. For example, when both a first supplying path 331 (see FIG. 6) and a second supplying path 332 (see FIG. 6) can be used, the switching portion 32 is able to switch between selection of the first supplying path 331 and the second supplying path 332 as the supplying path 33.

According to the configuration described above, switching of the supplying path 33 for each recording head 51 allows reduced temperature difference among the plurality of recording heads 51. In addition, the temperature difference among the plurality of recording heads 51 is restrained through switching of the supplying path 33, so that only one refrigerant supplying portion 31 is required to supply a refrigerant to the plurality of recording heads 51. This results in a simpler cooling device 3 than the one having a plurality of refrigerant supplying portions 31. Furthermore, the cooling device 3 having a plurality of recording heads 51 with reduced variation in the ink ejecting performance among them can be achieved. Restrained variation in the ink ejecting performance among the plurality of recording heads 51 allows to get an inkjet recording device 10 that is able to form a stabilized quality of image (image quality).

[2] Configuration of Head Cooling Device

Next, the configuration of the head cooling device 3 according to the present embodiment will be described in detail with reference to FIG. 2 and FIG. 4 to FIG. 7. As described above, the switch processing portion 71 of the head cooling device 3 in the present embodiment is provided to the control device 7, so that the control device 7 in the body 7 controls the head cooling device 3.

As described above, the head cooling device 3 includes the switching portion 32 and the switch processing portion 71. As shown in FIG. 2, the head cooling device 3 in the present embodiment further includes a temperature sensor 30.

The refrigerant supplying portion 31 supplies a refrigerant to a recording head 51 to collect heat generated in the recording head 51 using the refrigerant. As an example, the refrigerant in the present embodiment is water. Here, the refrigerant supplying portion 31 at least supplies the refrigerant to the recording head 51 so that the refrigerant and the recording head 51 are able to exchange heat. Thus, the refrigerant is not required to be supplied to an inside of the recording head 51 like ink. Specifically, the refrigerant supplying portion 31 supplies the refrigerant to a heat receiving member (for example, the heat exchanger 351 described later) thermally coupled to the recording head 51 to eventually supply the refrigerant to the recording head 51.

Figure 4:
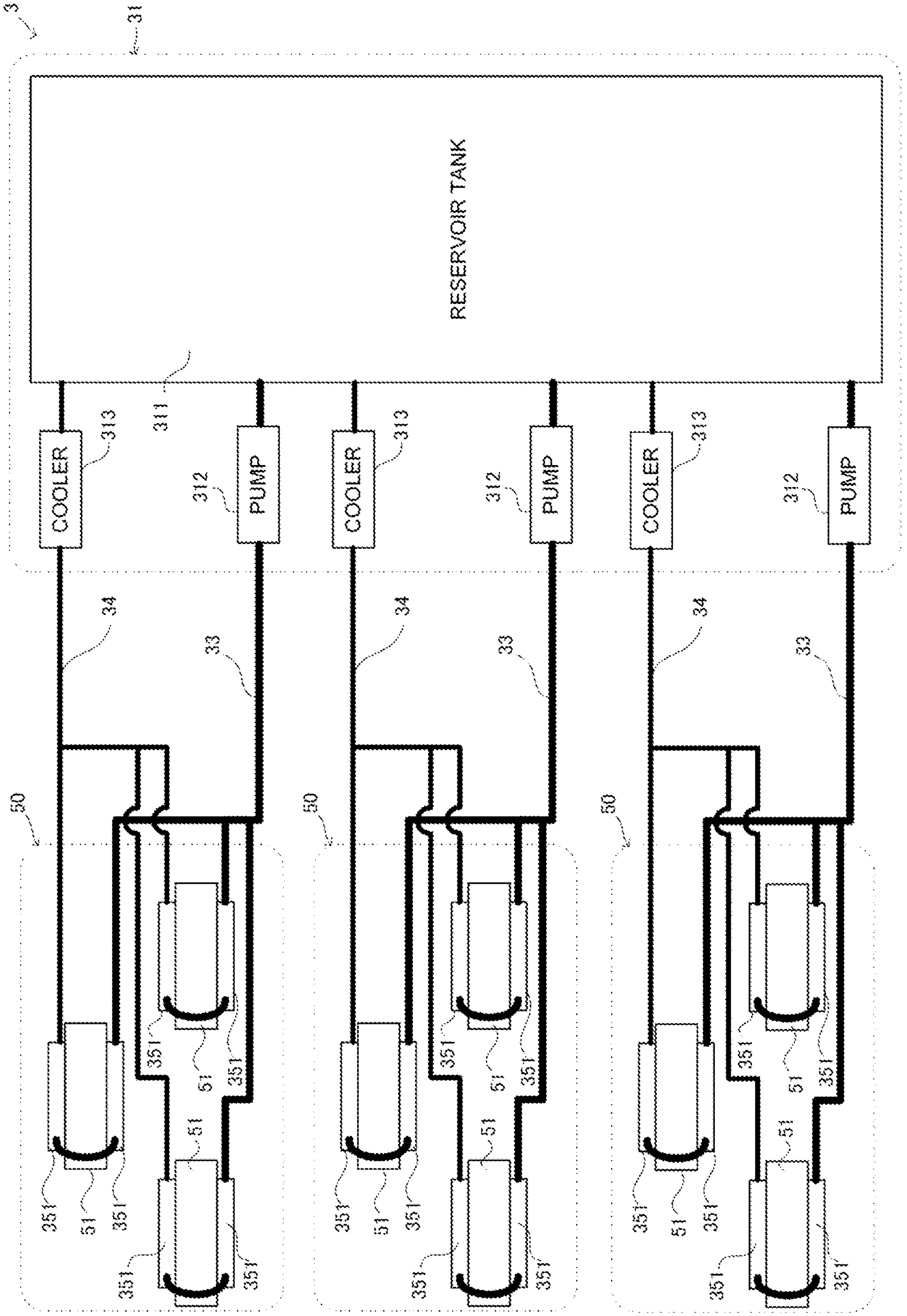
FIG. 4 is a schematic diagram showing the structure of a head cooling device according to the first embodiment.

In this embodiment, the refrigerant supplying portion 31 collects a refrigerant from a plurality of recording heads 51 through respective collecting paths 34 (see FIG. 4). The supplying paths 34 and collecting paths 34 are made of metal pipe or tube through which the refrigerant can flow. The refrigerant supplying portion 31 supplies a refrigerant to each of the plurality of recording heads 51 through respective supplying paths 33, which form sending flow paths, and collects the refrigerant through respective collecting paths 34 which form return flow paths, thereby circulating the refrigerant. Accordingly, the refrigerant supplying portion 31 is able to reuse the refrigerant, leading to efficient cooling of the plurality of recording heads 51.

More specifically, as shown in FIG. 4, the refrigerant supplying portion 31 includes a reservoir tank 311 for storing the refrigerant, pumps 312 and coolers 313. The refrigerant supplying portion 31 supplies the refrigerant of the reservoir tank 311 to the heat exchangers 351 thermally coupled to the respective heat receiving members and collects the refrigerant having heat taken from the respective recording heads 51. The refrigerant supplying portion 31 is connected to the heat exchangers 351 via the supplying paths 33 and the collecting paths 34. The heat exchangers 351 are provided to the respective recording heads 51 for heat exchange between the recording heads 51 and the refrigerant. In other words, the heat generated in the recording heads 51 is transferred to the refrigerant at the heat exchangers 351.

Specifically, the pumps 312, heat exchangers 351 (recording heads 51) and coolers 313 are serially connected to the reservoir tank 311 through flow paths of metal pipe or tube including the supplying paths 33 and the collecting paths 34. The pumps 312 circulate the refrigerant between the refrigerant supplying portion 31 and the recording heads 51 (heat exchangers 351) through the supplying paths 33 and the collecting paths 34. Thus, operation of the pumps 312 causes the refrigerant stored in the reservoir tank 311 to flow through the pumps 312, supplying paths 33, heat exchangers 351 (recording heads 51), collecting paths 34 and coolers 313 in this order to return to the reservoir tank 311.

The coolers 313 cool the refrigerant using an appropriate cooling means such as natural heat dissipation or forced cooling. That is, the refrigerant collected from the recording heads 51 (heat exchangers 351) through the collecting paths 34 is cooled in the coolers 313 and returned to the reservoir tank 311. As an example, the coolers 313 are radiators (heat radiators) dissipating heat from the refrigerant. Each cooler 313 discharges the refrigerant received from the collecting path 34 to the reservoir 311 through a plurality of branch pipes each having a plurality of fins. The cooler 313 applied with an air flow generated by a fan, for example, exchanges heat between the refrigerant and the air flow (air) to efficiently dissipate the heat of the refrigerant. With this, the heat of the recording head 51 collected by the refrigerant moves together with the refrigerant and is dissipated by the cooler 313. The cooler 313 may have a configuration to forcibly cool the refrigerant using a thermoelectric conversion element such as Peltier element, besides the radiator.

As an example of the present embodiment, as shown in FIG. 4, a refrigerant is supplied from a single pump 312 to the heat exchangers 351 of the plurality of recording heads 51 (three in this embodiment) included in a line-head 50 of each color. Similarly, the refrigerant after collecting the heat of the plurality of recording heads 51 (three in this embodiment) included in a line-head of each color returns to the reservoir tank 313 through a single cooler 311. That is, the refrigerant supplying portion 31 uses a common supplying path 33 and a common collecting path 34 to supply/collect the refrigerant to/from the plurality of recording heads 51 (three in this embodiment) included in a line-head of each color. This example is not limitative, however, and an individual pump 312 or cooler 313 may be provided to each recording head 51.

Figure 5:
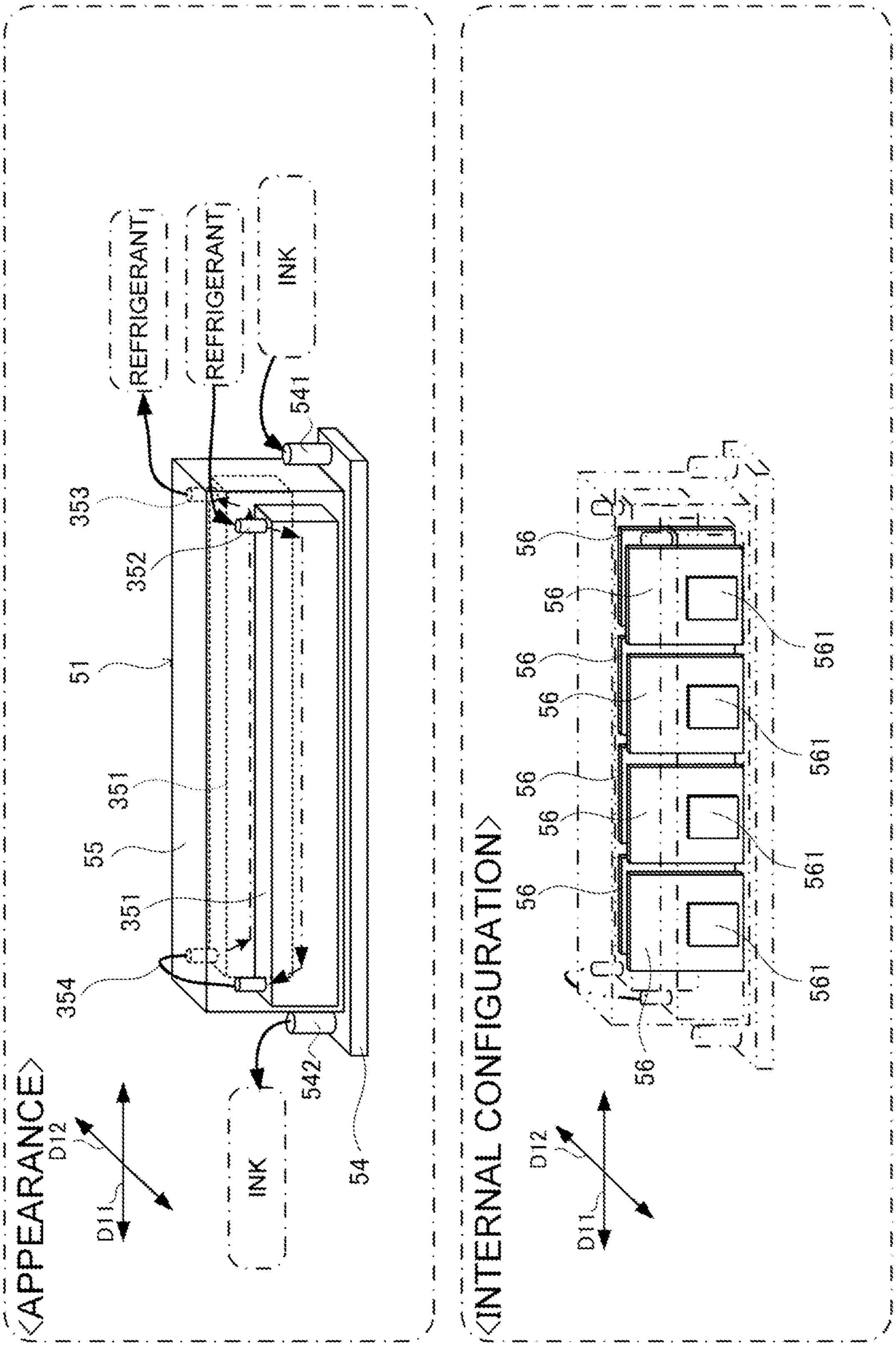
FIG. 5 is an external view and an internal view both showing the structure of a recording head of the inkjet recording device according to the first embodiment.

As shown in FIG. 5, one recording head 51 is provided with two heaters 351 (one pair). Each of the plurality of recording heads 51 includes a nozzle plate 54 and a cover 55. Each recording head 51 ejects ink, which is supplied from the ink supplying portion 6 to the nozzle plate 54, through a plurality of multiple ink nozzles 53 formed on the bottom surface of the nozzle plate 54. The nozzle plate 54 includes a heater to heat ink. FIG. 5 shows on the upper area thereof the appearance of the recording head 51 and shows on the lower area thereof the internal configuration of the recording head 51 with the nozzle plate 54, cover 54 and heater 351 illustrated with imaginary lines (two dotted lines).

The nozzle plate 54 is rectangular extending in the main scanning direction D11 in the plan view. The nozzle plate 54 is provided with a plurality of ink nozzles 54 for ejecting ink. With this, the bottom surface of the nozzle plate 54 forms a bottom surface of the recording head 51, which is the ink ejecting face. The nozzle plate 54 is provided with an ink inlet 541 at one end thereof forming an ink entrance and an ink outlet 542 at the other end thereof forming an ink exit, in the longitudinal direction (main scanning direction D11). With this, the ink supplied from the ink supplying portion 6 is introduced into the nozzle plate 54 through the ink inlet 541 and is discharged therefrom through the ink outlet 542. On the upper surface of the nozzle plate 54, a plurality of base plates 56 (eight in the example of FIG. 5) each mounting a driver composed of an integrated circuit is mounted. The recording head 51 ejects ink from the ink nozzles 53 of the nozzle plate 54 as the piezoelectric elements are driven by the drivers 61.

The cover 55 is coupled with the nozzle plate 54 so as to cover the plurality of base plates 56. Specifically, the cover has a box shape with its bottom opened and is disposed on the upper surface of the nozzle plate 54, accommodating inside thereof the plurality of base plates 56. As an example, the nozzle plate 54 and the cover 55 are metal, e.g., aluminum, or resin members having thermal conductivity. The plurality of base plates 56 are disposed so that the drivers 561 contact the inner side surface of the cover 55. This makes the drivers 561 thermally couple with the cover 55. Furthermore, the cover 55 is thermally coupled with the nozzle plate 54, which makes the drivers 561 thermally couple with the ink inside the nozzle plate 54 (through the cover 55).

The ink ejection performance of the recording head 51 can vary depending on the temperature of ink, so that controlling the temperature of the ink in a temperature zone to lead to the stabilized ink ejection performance is desired. Hereinafter, the temperature zone leading to stabilized ink ejecting performance is referred to as a "stabilized temperature zone". The ink inside the nozzle plate 54 does not reach the stabilized temperature zone in some cases where, for example, the inner side temperature of the body 2 and the drivers 561 are not sufficiently heated up right after starting up of the inkjet recording device 10 under the environment of relatively low outside temperature such as in winter season. In such a case, the recording head 51 heats the ink by heater so that the temperature of the ink reaches the stabilized temperature zone. The heater to heat the ink is provided to the nozzle plate 54 or base plate 56 as appropriate.

A pair of heat exchangers 351 is provided to the cover, one at one side and the other at the other side of the cover 55 in the lateral direction (in the sub-scanning direction D12). The heat exchangers 351 each are formed so as to extend outside from a corresponding side surface of the cover 55 in the lateral direction. Here, the pair of heat exchangers 351 is integrally formed with the cover 55. The heat exchangers 351 are metal, e.g., aluminum, or resin members having thermal conductivity.

The heat exchangers 351 each have a flow path for circulating inside thereof a refrigerant. One of the heat exchangers 351 is provided with a refrigerant inlet 352, forming an entrance of the refrigerant, at one end thereof in the longitudinal direction (main scanning direction D11) while the other one of the heat exchangers 351 is provided with a refrigerant outlet, forming an exit of the refrigerant, at one side thereof in the longitudinal direction. The heat exchangers 351 are connected together with a connecting flow path 354 at the other ends in the longitudinal direction. The refrigerant inlet 352 is connected to the supplying path 33 while the refrigerant outlet 353 is connected to the collecting path 34. Accordingly, the refrigerant supplied from the pump 312 is introduced into the heat exchangers 351 from the refrigerant inlet 352 and is discharged from the refrigerant outlet 353 after circulating inside the heat exchangers 351.

In the configuration described above, the refrigerant circulating inside the heat exchangers 351 is thermally coupled with the drivers 561 (via the cover 55) and is further thermally coupled with the ink inside the nozzle plate 54 (via the cover 55). Thus, when the recording head 51 ejects ink, the heat generated by the drivers 561 operating as a heat source is collected by the refrigerant circulating inside the heat exchangers 351 and is conveyed to the cooler 313 through the collecting path 34. As above, the refrigerant supplying portion 31 cools the recording head 51 through collection of the heat generated by the recording head 51 using the refrigerant.

The supplying path 33, collecting path 34 and switching portions 32 will be described in detail below with reference to FIG. 6 and FIG. 7.

Figure 6:
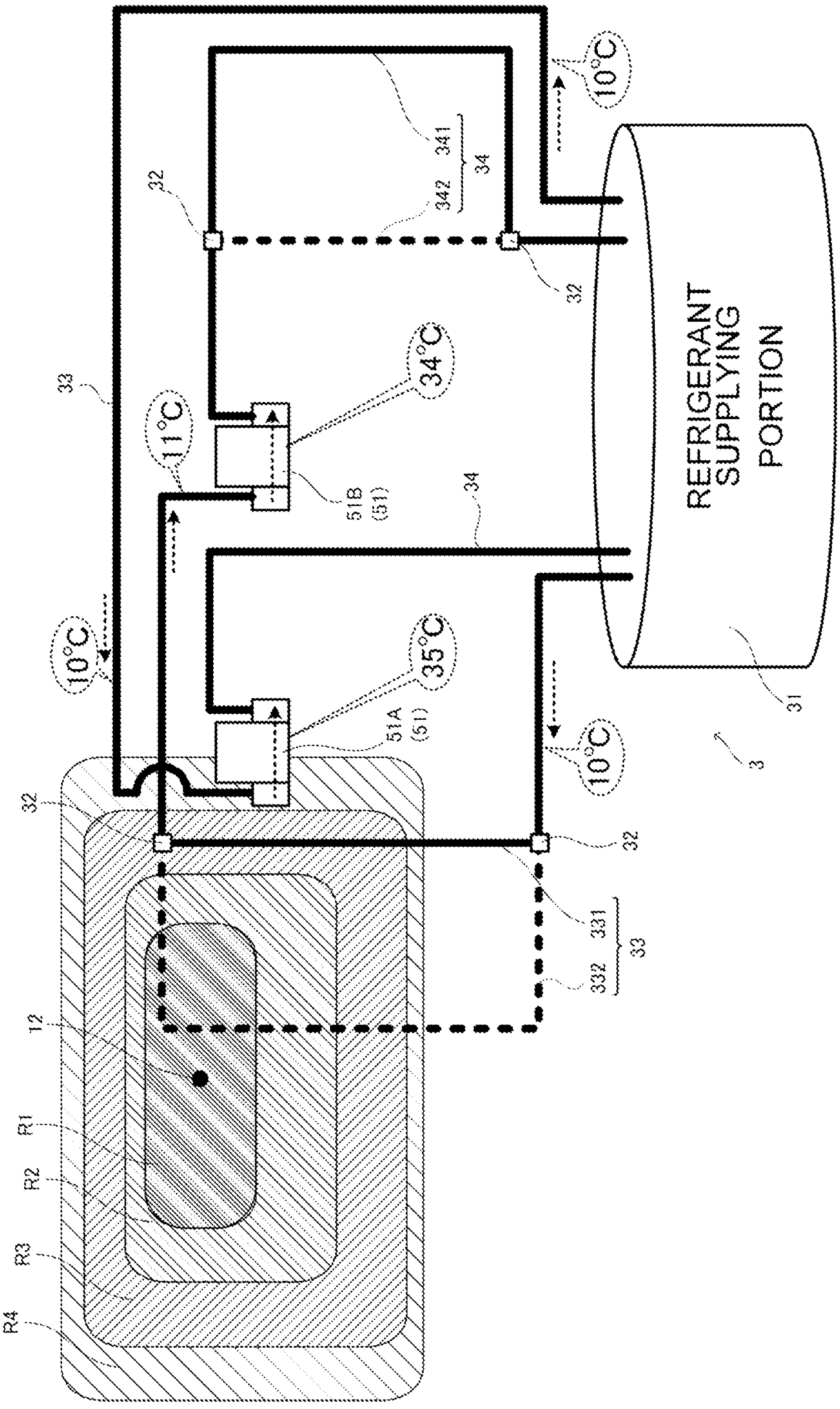
FIG. 6 is a schematic diagram showing a first state of the head cooling device.
Figure 7:
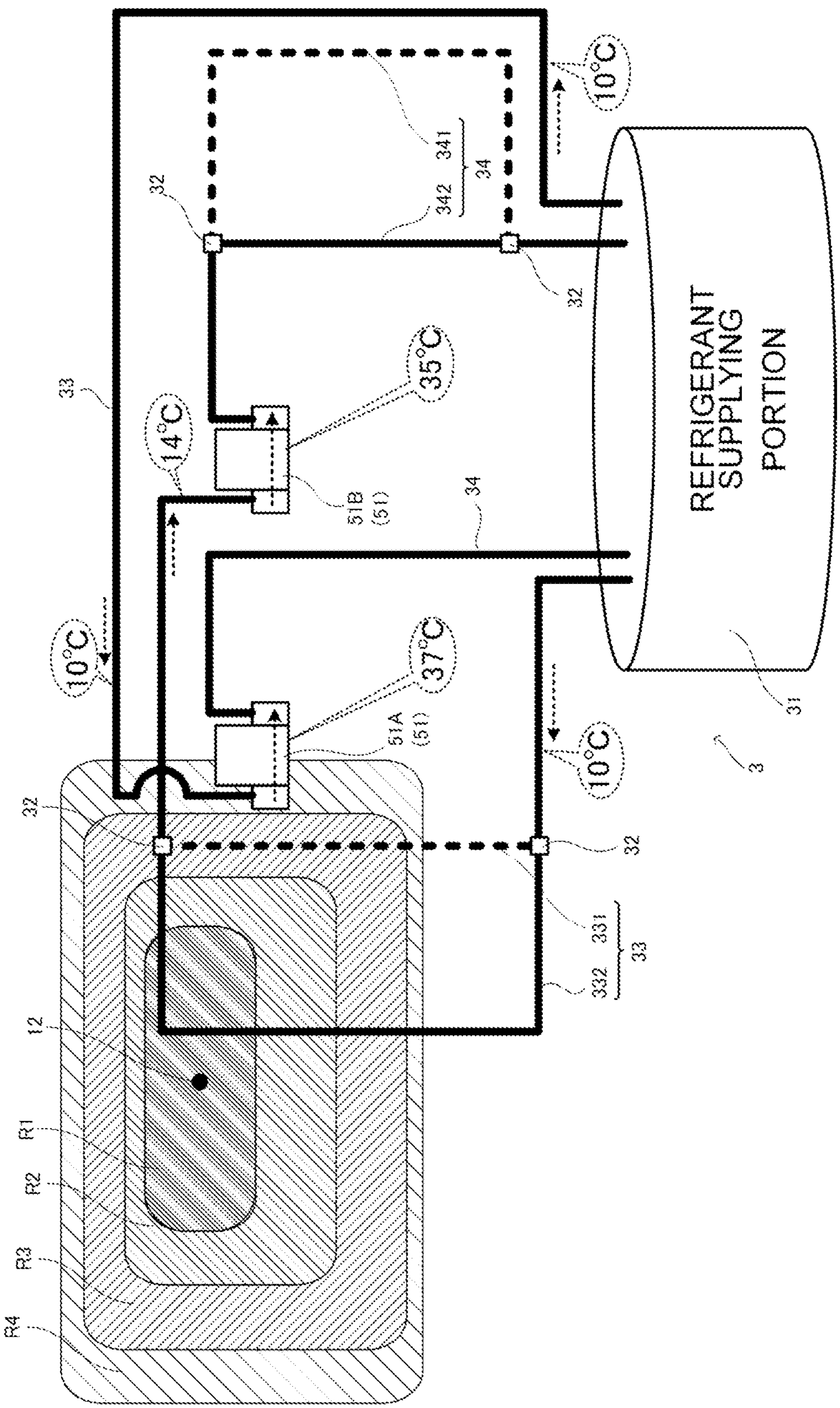
FIG. 7 is a schematic diagram showing a second state of the head cooling device.

FIG. 6 and FIG. 7 schematically show the connecting relation in the head cooling device 3 by picking up two (two colors) line-heads 50 out of four (four colors) aligning in the main scanning direction D11. In FIG. 6 and FIG. 7, only one recording head 51 out of a plurality of recording heads 51 included in each one of two line-heads 50 is illustrated, and each supplying path 33 and each collecting path 34 connected to the corresponding recording head 51 are schematically shown.

In addition, FIG. 6 and FIG. 7 schematically show the temperature distribution inside the housing 21 with the zones R1, R2, R3, R4. Particularly, the temperature distribution shown here is caused by the heat generated by a heat source. The "heat source" here is a component or member that can be the heat source excluding the plurality of recording heads 51, and one example thereof is a drying device 12. Specifically, the drying device 12 provided at a rear stage of the inkjet recording device 10 in this embodiment includes a heating unit inside a drying chamber. The drying device 12 applies heat to the surface of the sheet Sh1 on which an ink image is formed to dry the image. Thus, the drying device 12 generates heat as a heat source, for example, during operation. Accordingly, of the four zones R1 to R4, the zone R1 nearest to the heating unit of the drying device 12 has the highest temperature among them, while the zone R2 has a lower temperature than the zone R1, the zone R3 has a lower temperature than the zone R2, and the zone R4 has a lower temperature than the zone R3.

The head cooling device 3 according to the present embodiment has potentially a first supplying path 331 and a second supplying path 332, as the supplying path 33. Furthermore, the head cooling device 3 in the present embodiment has potentially a first collecting path 341 and a second collecting path 342, as the collecting path 34. That is, the refrigerant supplying portion 31 is connected to the corresponding recording head 51 through the first supplying path 331 and the second supplying path 332, functioning as the supplying path 33, and through the first collecting path 341 and the second collecting path 342, functioning as the collecting path 34. Of the recording heads 51 in each of the four line-heads 50, the recording head 51 to be a reference head is connected to the refrigerant supplying portion 31 through a single supplying path 33 and a single collecting path 34. Here, one of the recording heads 51 to be the reference head can be designated as a "recording head 51A", being distinguished from the other recording heads 51 designated as "recording head 51B".

The reference head (recording head 51A) is a recording head that is affected most by the heat of a heat source among a plurality of recording heads, the plurality of recording heads being excluded from the heat source. In other words, if the drying device 12 is a heat source, the recording head 51A being affected most by the heat generated by the drying device 12 becomes the reference head. In the present embodiment, the drying device 12 and the body 2 are aligned in the main scanning direction D11. Thus, of the four line-heads 50 aligning in the main scanning direction D11, the recording head 51A of the line head 50 nearest to the drying device 12 (that is the position near the end of the drying device 12) becomes the reference head. In the examples of FIG. 6 and FIG. 7, the recording head 51A is disposed in the zone R4 that is affected by the heat of the drying device 12. Accordingly, in each of the four line-heads 50 aligning in the main scanning direction D11, the recording heads 51 other than the recording head 51A near the end of the drying device 12 become the recording heads 51B.

The refrigerant supplying portion 31 supplies a refrigerant to a recording head 51 much affected by the heat source, excluding the recording heads 51, through a supplying path less affected by the heat source. That is, in the present embodiment, the recording head 51A much more affected by the heat of the drying device 12 than the recording head 51B is provided with a supplying path 33 that is less affected by the heat of the heat source (drying device 12). Thus, as shown in FIG. 6 and FIG. 7, the supplying path 33 connected to the recording head 51A is detoured to the far side (right side in the figure) of the heat source (drying device 12) so as not to pass the zones R1 to R4 affected by the heat of the heat source. Contrary, the supplying path 33 connected to the recording head 51B is detoured to the side of the heat source (drying device 12) (left side in the figure). With this arrangement, the recording head 51A much affected by the heat of the heat source is more efficiently cooled than the recording head 51B as the refrigerant passing through the supplying path 33 of the recording head 51A is less affected by the heat of the heat source.

The supplying path 33 to be connected to the recording head 51B is alternatively selected from the first supplying path 331 and the second supplying path 332, as described above. That is, the supplying path 33 is at least partially diverged into the first supplying path 331 and the second supplying path 332 together forming a parallel flow path. Thus, the refrigerant supplying portion 31 supplies a refrigerant to the recording head 51B through either one of the first supplying path 331 and the second supplying path 332. The first supplying path 331 is less affected by the heat of the heat source (drying device 12) than the second supplying path 332. This is shown in FIG. 6 and FIG. 7 in such a manner that the first supplying path 331 is detoured to a relatively far side from the heat source (drying device) so as not to pass the zones R1 to R4 that are affected by the heat of the heat source. On the other hand, the second supplying path 332 is detoured to a relatively near side from the heat source (drying device 12) so as to pass the zone R1 having the highest temperature among the zones R1 to R4. In other words, the amount of heat that the first supplying path 331 receives from the heat source differs from that of the second supplying path 332, the former being greater than the latter.

Because of the layout described above, the length of the first supplying path 331 differs from that of the second supplying path 332. As an example, in the present embodiment, the length of the first supplying path 331 is shorter than that of the second supplying path 332. That is, the second supplying path 332 employing the layout of detouring near the heat source is longer than the first supplying path 331.

Similarly, the collecting path 34 to be connected to the recording head 51B is alternatively selected from the first collecting path 341 and the second collecting path 342, as described above. That is, the collecting path 34 is at least partially diverged into the first collecting path 341 and the second collecting path 342 together forming a parallel flow path. Thus, the refrigerant supplying portion 31 collects a refrigerant from the recording head 51B through either one of the first collecting path 341 and the second collecting path 342. The length of the first collecting path 341 is longer than that of the second collecting path 342.

The switching portions 32 can switch the supplying path 33 of the recording head 51B. Specifically, the switching portions 32 each are composed of a valve and provided to each diverged point between the first supplying path 331 and the second supplying path 332 of the supplying path 33. The valve of each switching portion 32 is a solenoid valve and operates in response to a control signal from the switch processing portion 71. This allows the switching portion 32 to switch between the first supplying path 331 and the second supplying path 332 of the supplying path 33.

In the present embodiment, the switching portions 32 can switch the collecting path 34 as well as the supplying path 33 for each recording head 51. In other words, the switching portions 32 can switch not only the supplying path 33 but also the collecting path 34 of the recording head 51B. The switching portions 32 each are made of a valve and provided to each diverged point between the first collecting path 341 and the second collecting path 342 of the collecting path 34. This allows the switching portion 32 to switch between the first collecting path 341 and the second collecting path 342 of the collecting path 34.

The switch processing portion 71 switches the collecting path 34 of the recording head 51B when switching the supplying path 33 of the recording head 51B. Specifically, the switch processing portion 71 selects the first collecting path 341 as the collecting path 34 when selecting the first supplying path 331 as the supplying path 33. Similarly, the switch processing portion 71 selects the second collecting path 342 as the collecting path 34 when selecting the second supplying path 332 as the supplying path 33.

To sum up, as shown in FIG. 6, the head cooling device 3 according to the present embodiment is able to switch between a "first state" where the first supplying path 331 and the first collecting path 341 are selected and a "second state" where the second supplying path 332 and the second collecting path 342 are selected. In FIG. 6 and FIG. 7, the selected supplying path 33 and collecting path 34 are illustrated with solid lines while the non-selected supplying path 33 and collecting path 34 are with broken lines.

In the first state shown in FIG. 6, the temperature of the refrigerant to be supplied to the recording head 51B can be restrained relatively low. That is, if the temperature of the refrigerant to be supplied from the refrigerant supplying portion 31 is "10° C.", the temperature of the refrigerant to be supplied to the recording head 51A is kept "10° C.". On the other hand, the temperature of the refrigerant to be supplied to the recording head 51B slightly increases to, for example, about "11° C.", because the supplying path 33 (first supplying path 331) connected to the recording head 51B is affected by the heat of the heat source (drying device 12). In this state, the cooling effect of the head cooling device 3 with respect to the recording head 51B becomes "High", and thus the temperature of the recording head 51A becomes "35° C." while that of the recording head 51B becomes "34° C.", for example.

On the other hand, in the second state shown in FIG. 7, the temperature of the refrigerant to be supplied to the recording head 51B becomes relatively high. That is, if the temperature of the refrigerant to be supplied from the refrigerant supplying portion 31 is "10° C.", the temperature of the refrigerant to be supplied to the recording head 51A is kept "10° C.". On the other hand, the temperature of the refrigerant to be supplied to the recording head 51B slightly increases to, for example, about "14° C.", because the supplying path 33 (second supplying path 332) connected to the recording head 51B is affected by the heat of the heat source (drying device 12). This is because the second supplying path 332 receives larger amount of heat of the heat source (drying device 12) than the first supplying path 331. The larger amount of heat is able to apply heat to the refrigerant circulating through the second supplying path 332. In this state, the cooling effect of the head cooling device 3 with respect to the recording head 51B becomes "Low", and thus the temperature of the recording head 51A becomes "37° C." while that of the recording head 51B becomes "35° C.", for example.

Thus, when the temperature difference between the recording head 51A and the recording head 51B increases due to the increased temperature of the recording head 51A caused by the heat of the heat source (drying device 12), for example, the temperature difference is reduced by switching the first state to the second state. That is, switching the first state to the second state causes the head cooling device 3 to change its cooling effect from "High" to "Low", which can raise the temperature of the recording head 51B to follow that of the recording head 51A, resulting in restrained temperature difference between the recording head 51A and the recording head 51B.

The switch processing portion 71 in this embodiment controls the switching portion 32 to switch the collecting path 34 of the recording head 51 to be shorter when the supplying path 33 thereof is switched to be longer. Specifically, when the supplying path 33 of the recording head 51B is switched from the first supplying path 331 to the second supplying path 332 having a longer path, the collecting path of the recording head 51B is switched from the first collecting path 341 to the second collecting path 342 having a shorter path. With this, variation in the length of the entire path of the refrigerant including the supplying path 33 and the collecting path 34 is restrained small. As a result, the discharging capacity that the pump 312 is required to have in the first state can be similar to that in the second state. Here, the total length of the first supplying path 331 and the first collecting path 341 is preferably the same or substantially the same as the total length of the second supplying path 332 and the second collecting path 342.

The temperature sensor 30 measures the temperature of the corresponding recording head 51. As an example, the temperature sensor 30 is thermally coupled to the cover 55 of the corresponding recording head 51. The result of the measurement of the temperature sensor 30 (data related to the temperature of the recording head 51) is outputted to the control device 7.

The switch processing portion 71 controls the switching portion 32 in response to the temperature of the corresponding one of the plurality of recording heads 51A, 51B. In other words, the switch processing portion 71 controls the switching portion 32 based on the result of the measurement of the temperature sensor 30 to switch between the first state and the second state. Thus, the switch processing portion 71 can control the switching portion 32 using relatively simple processing in which some condition is set to the temperatures of the recording heads 51A, 51B.

In FIG. 6 and FIG. 7, two (two color) line-heads 50 among the four (four colors) line-heads 50 aligned in the main scanning direction D11 are described though, the remaining two line-heads are basically provided with the similar configuration as the recording head 51B. That is, the recording heads 51 in the remaining line-heads 50 include respective supplying paths 33 and collecting paths 34, each configured to be switchable.

[3] Cooling Control Method

Figure 8:
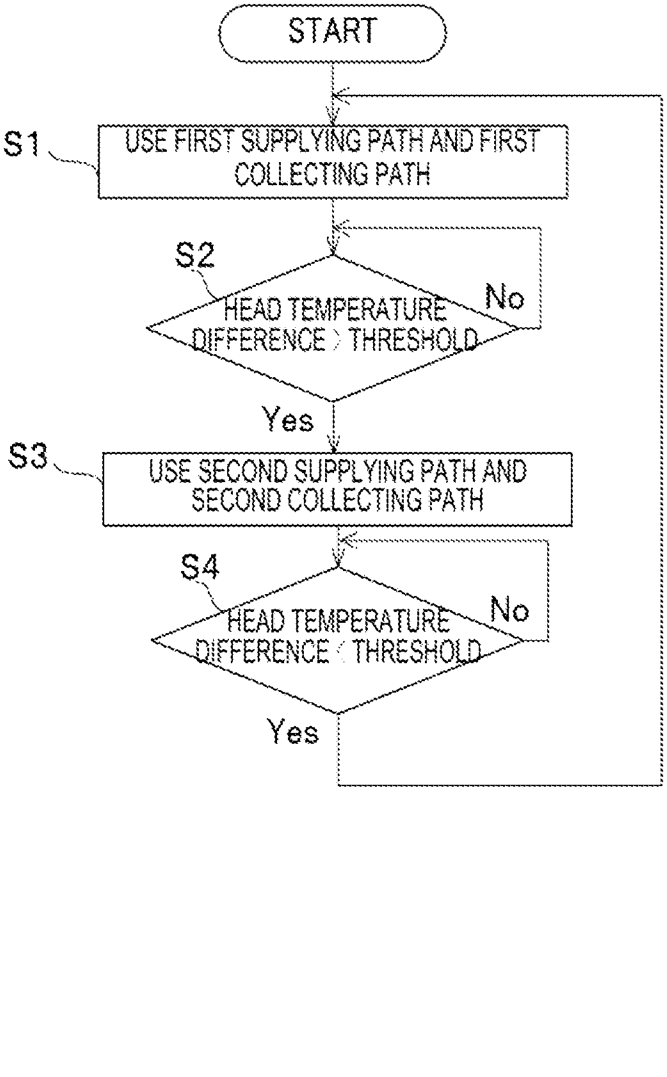
FIG. 8 is a flowchart showing an example of method to control the head cooling device.

A cooling control method to be implemented by the control device 7 of the head cooling device 3 having the configuration described above will be described with reference to the flowchart of FIG. 8. Here, the Steps S1 to S4 indicate the numbers of the processing (steps) implemented by the control device 7. The processing illustrated in FIG. 8 each is implemented when predetermined trigger requirement is fulfilled. The predetermine trigger requirement is, for example, an activation of an inkjet recording device 10 and acceptance of printing request by the inkjet recording device 10.

[Step S1]

First, in Step S1, the switch processing portion 71 of the control device 7 selects the first state that is exemplified in FIG. 6. Here, the switch processing portion 71 controls the switching portion 32 to select the first supplying path 331 as the suppling path 33 and the first collecting path 341 as the collecting path 34 for the recording head 51B. The switch processing portion 71 moves the processing to Step S2 after completion of Step S1.

[Step S2]

In Step S2, the switch processing portion 71 of the control device 7 compares the temperature difference between the recording head 51A and the recording head 51B with a threshold. Here, the switch processing portion 71 acquires temperature information of the recording heads 51A, 51B to determine the temperature difference between them. Specifically, the switch processing portion 71 acquires an output from the temperature sensor 30 of the head cooling device 3. Acquisition of the temperature information may be performed constantly or intermittently (every 10 seconds, for example). The switch processing portion 71 may acquire as temperature information a value where the output from the temperature sensor 30 is applied with appropriate arithmetic processing such as averaging processing, and may not acquire the output from the temperature sensor 30 as is.

The threshold here indicates a predetermined value and is set according to the ink ejecting performance. If less than 2° C. temperature difference between the recording head 51A and the recording head 51B is assumed to have no variation in the ink injecting performance between them, the threshold is set to "2° C.". Here, the recording head 51A, or the reference head, is most affected by the heat of the heat source (drying device 12) among the plurality of recording heads 51, so that the recording head 51A has a higher temperature rising rate than the recording head 51B. Thus, increased temperature difference between the recording head 51A and the recording head 51B due to increased temperature of the recording head 51A eventually exceeds the threshold.

The switch processing portion 71 moves the processing to Step S3 when the temperature difference between the recording head 51A and the recording head 51B exceeds the threshold (2° C., in this embodiment) (S2: Yes). In contrast, the switch processing portion 71 returns the processing to Step S2 when the temperature difference between the recording head 51A and the recording head 51B is equal to or less than the threshold (S2: No).

[Step S3]

In Step S3, the switch processing portion 71 of the control device 7 selects the second state exemplified in FIG. 7. Here, the switch processing portion 71 controls the switching portion 32 to select the second supplying path 332 as the supplying path 33 and the second collecting path 342 as the collecting path 34 for the recording head 51B. As a result, switching the first state to the second state causes the head cooling device 3 to change its cooling effect from "High" to "Low", which can raise the temperature of the recording head 51B to follow that of the recording head 51A, resulting in restrained temperature difference between the recording head 51A and the recording head 51B.

Specifically, when the temperature difference between the recording head 51A and the recording heads 51B increases due to the increased temperature of the recording head 51A caused by the heat of the heat source (drying device 12), for example, so as to exceed the threshold (2° C., here) (S2: Yes), the temperature difference is decreased by switching the first state to the second state. As above, the switch processing portion 71 controls the switching portion 32 to switch the supplying path 33 so that the temperature difference among the plurality of recording heads 51A, 51B decrease. The switch processing portion 71 moves the processing to Step S4 after completion of Step S3.

[Step S4]

In Step S4, the switch processing portion 71 of the control device 71 compares the temperature difference between the recording head 51A and the recording head 51B with the threshold. In this stage, the switch processing portion 71 acquires temperature information of the recording heads 51A, 51B in order to determine the temperature difference between the recording head 51A and the recording head 51B. Specifically, the switch processing portion 71 acquires an output from the temperature sensor 30 of the head cooling device 3.

In Step S3, the cooling effect of the head cooling device 3 with respect to the recording head 51B is switched from "High" to "Low", which increases the temperature rising rate of the recording head 51B. Decreased temperature difference between the recording head 51A and the recording head 51B due to increase of the temperature of the recording head 51B eventually decreases the temperature difference between them below the threshold.

The switch processing portion 71 returns the processing to Step S1 if the temperature difference between the recording head 51A and the recording head 51B is below the threshold (2° C., in this embodiment) (S4: Yes). Contrary, the switch processing portion 71 returns the processing to Step S4 if the temperature difference between the recording head 51A and the recording head 51B is equal to or higher than the threshold (S4: No).

As described above, designating at least one of the plurality of recording heads as a reference head 51A, the switch processing portion 71 switches the supplying path 33 so that at least one of the plurality of recording heads 51 (recording head 51B) can have a temperature close to that of the reference head. In other words, when the temperature of the reference head (recording head 51A) increases, the head cooling device 3 according to the present embodiment operates so that the cooling effect thereof with respect to the remaining recording heads 51B decreases. This allows the temperature of the reference head to follow that of the remaining recording heads 51B. Accordingly, the temperature difference between the recording head 51A and the remaining recording heads 51B is kept small with a configuration where the supplying path 33 of the reference head is fixed while the supplying paths 33 of the recording heads 51B each are switched with a relatively simple operation.

The processing of the cooling control method described above is merely an example. The order of the processing shown in FIG. 8 with the flowchart may be selectively changed, some of the processing may be excluded, or some other processing may be added.

[4] Modified Example

A plurality of components included in the inkjet recording device 10 may be separated into a plurality of housings. For example, the inkjet portion 5 and the ink supplying portion 6 may be provided separately in a corresponding housing.

In contrast, in the first embodiment, at least one of the components provided separately from the inkjet recording device 10 may be provided to the inkjet recording device 10 as a component thereof. For example, at least one of the sheet-feeding device 11, the drying device 12 and the discharging device 13 may be provided inside the housing 21 in an integrated manner with the body 2 of the inkjet recording device 10. Similarly, the head cooling device 3 may be provided inside the housing 21.

The image forming target on which an image is formed by the inkjet recording device 10 is not restricted to the sheet Sh1 of paper or resin film, and may be, for example, a roll-shaped cloth such as a non-woven fabric or a cloth. When the target is cloth, the inkjet recording device 10 is a textile printing machine (textile printer) that ejects ink on the cloth to dye the fabric fibers of the cloth with ink, forming an image on the cloth.

The threshold to be compared with the temperature difference between the recording head 51A and the recording head 51B is not limited to the above-described value (2° C.) and can be set appropriately. The threshold may be provided with hysteresis. In this case, the value of threshold for switching from the first state to the second state differs from the value of threshold for switching from the second state to the first state.

The reference head is not limited to the recording head 51 affected most by the heat of the heat source and may be a recording head 51 affected least by the heat of the heat source. The reference head may not be fixed and may be changed appropriately among a plurality of recording heads 51.

The heat source excluding the recording heads 51 is not limited to the drying device 12 and may include, for example, a power circuit and a backlight.

The head cooling device 3 may have a configuration to control the cooling performance wherein the cooler 313 is actively controlled to adjust the temperature of the refrigerant circulated from the reservoir tank 311. In this case, the temperature difference among the recording heads 51 is preferably controlled, for example, through controlling of the cooling performance of the head cooling device 3 before switching of the supplying path 33. This can keep the temperature of the reference head in the stabilized temperature zone.

Switching of the supplying path 33 is not limited to two stages of the first supplying path 331 and the second supplying path 332 and may be three or more stages. That is, the supplying path 33 may include three or more paths as selection.

Second Embodiment

Figure 9:
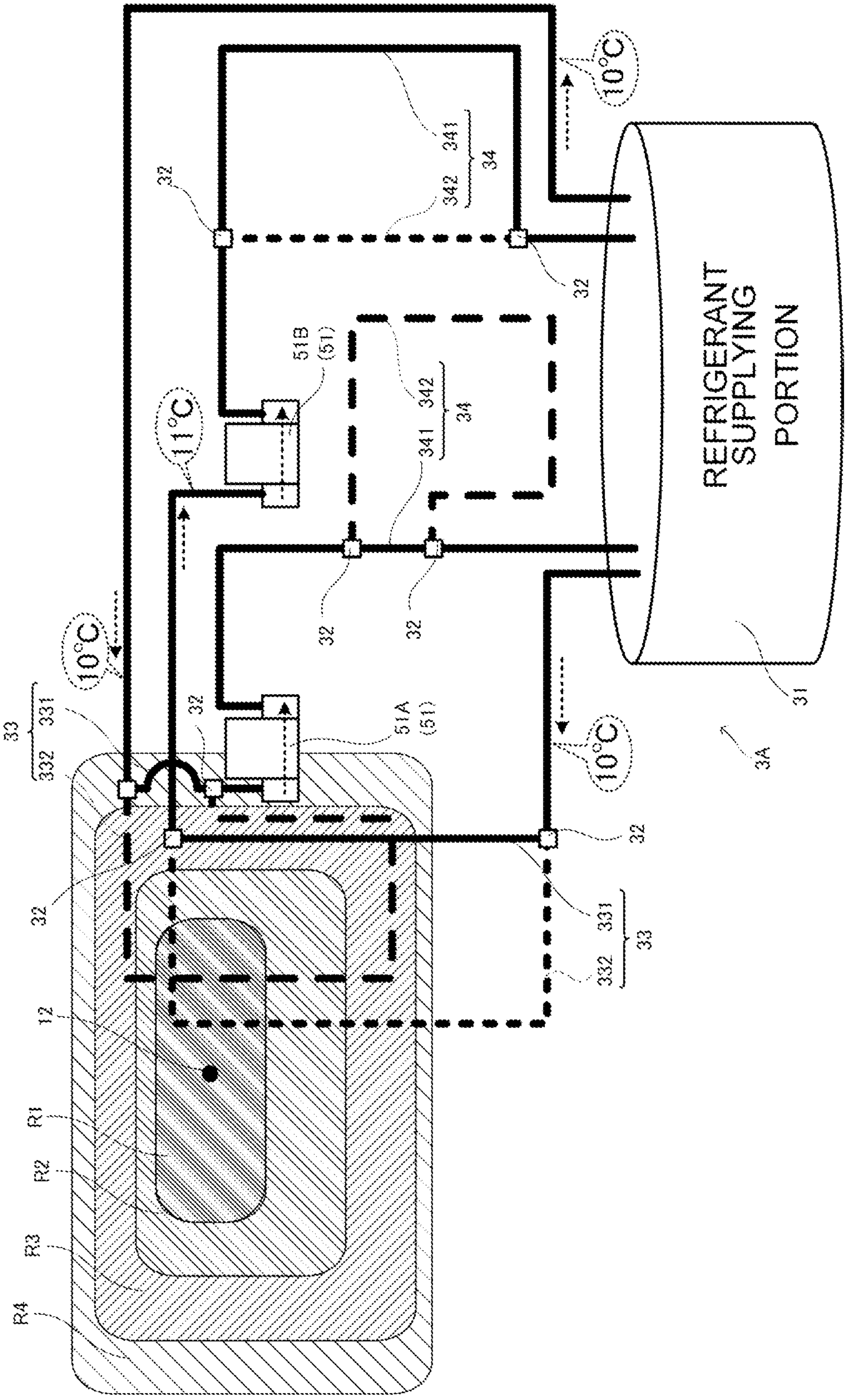
FIG. 9 is a schematic diagram showing a structure of the head cooling device according to a second embodiment.

As shown in FIG. 9, the head cooling device 3A according to the present embodiment differs from the head cooling device 3 according to the first embodiment in that in the former all of a plurality of recording heads 51 each have a supplying path 33 to be switched. Below, components similar to those in the first embodiment are assigned with the same references and description thereof is omitted.

In this embodiment, the supplying path 33 of the recording head 51A can be switched between the first supplying path 331 and the second supplying path 332, like in the case of the recording head 51B. Furthermore, the collecting path 34 of the recording head 51A can also be switched between the first collecting path 341 and the second collecting path 342.

In this embodiment, no reference head with a fixed supplying path 33 is provided, with which each of the supplying paths 33 of the corresponding one of the plurality of recording heads 51 can be switched. Thus, the supplying path 33 of the recording head 51A can be the first supplying path 331 or the second supplying path 332 and the supplying path 33 of the recording head 51B can be the second supplying path 332 or the first supplying path 331. Accordingly, the cooling effect of the head cooling device 3A of each of the plurality of recording heads 51 can be switched between "High" and "Low". This allows easy control of the temperature of each recording head 51 in the stabilized temperature zone.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A head cooling device comprising:

a refrigerant supplying portion supplying a refrigerant to each of a plurality of recording heads through a corresponding supplying path, the plurality of recording heads each ejecting ink;

a switching portion switching a corresponding supplying path of at least one of the plurality of recording heads; and a switch processing portion controlling the switching portion to switch the supplying path so as to reduce temperature difference among the plurality of recording heads, wherein the refrigerant supplying portion collects the refrigerant from each of the plurality of recording heads through a corresponding collecting path, wherein the switching portion is able to switch a corresponding supplying path and another switching portion is able to switch a corresponding collecting path of each of the recording heads, and wherein the switch processing portion controls the another switching portion of a recording head to switch the collecting path to be shorter when a corresponding supplying path is switched to be longer.

2. The head cooling device of claim 1, wherein the refrigerant supplying portion supplies a refrigerant to a recording head more affected by the heat of a heat source compared to other recording heads of the plurality of recording heads, through the corresponding supplying path, the corresponding supplying path is less affected by the heat of the heat source compared to other supplying paths corresponding to the other recording heads, and the heat source excludes the plurality of recording heads.

3. The head cooling device of claim 1, wherein the switch processing portion controls the switching portion in response to the temperature of the corresponding one of the plurality of recording heads.

4. The head cooling device of claim 1, wherein the switch processing portion switches the supplying path so that the temperature of at least one of the plurality of recording heads comes closer to the temperature of a reference head, the reference head being selected from the plurality of recording heads.

5. The head cooling device of claim 4, wherein the reference head is a recording head that is affected most by the heat of a heat source among the plurality of recording heads, the heat source excluding the plurality of recording heads.

6. An inkjet recording device comprising:

the head cooling device of claim 1; and a body including the plurality of recording heads.

7. A cooling control method to be used with a head cooling device, the device including:

a refrigerant supplying portion supplying a refrigerant to each of a plurality of recording heads through a corresponding supplying path, the plurality of recording heads each ejecting ink; and a switching portion switching a corresponding supplying path of at least one of the plurality of recording heads, wherein the refrigerant supplying portion collects the refrigerant from each of the plurality of recording heads through a corresponding collecting path, and wherein the switching portion is able to switch a corresponding supplying path and another switching portion is able to switch a corresponding collecting path of each of the recording heads, the method comprising:

controlling the switching portion to switch the corresponding supplying path so that the temperature difference among the plurality of recording heads decreases; and controlling the another switching portion of a recording head to switch the collecting path to be shorter when a corresponding supplying path is switched to be longer.

* * * * *